UNITED STATES PATENT OFFICE.

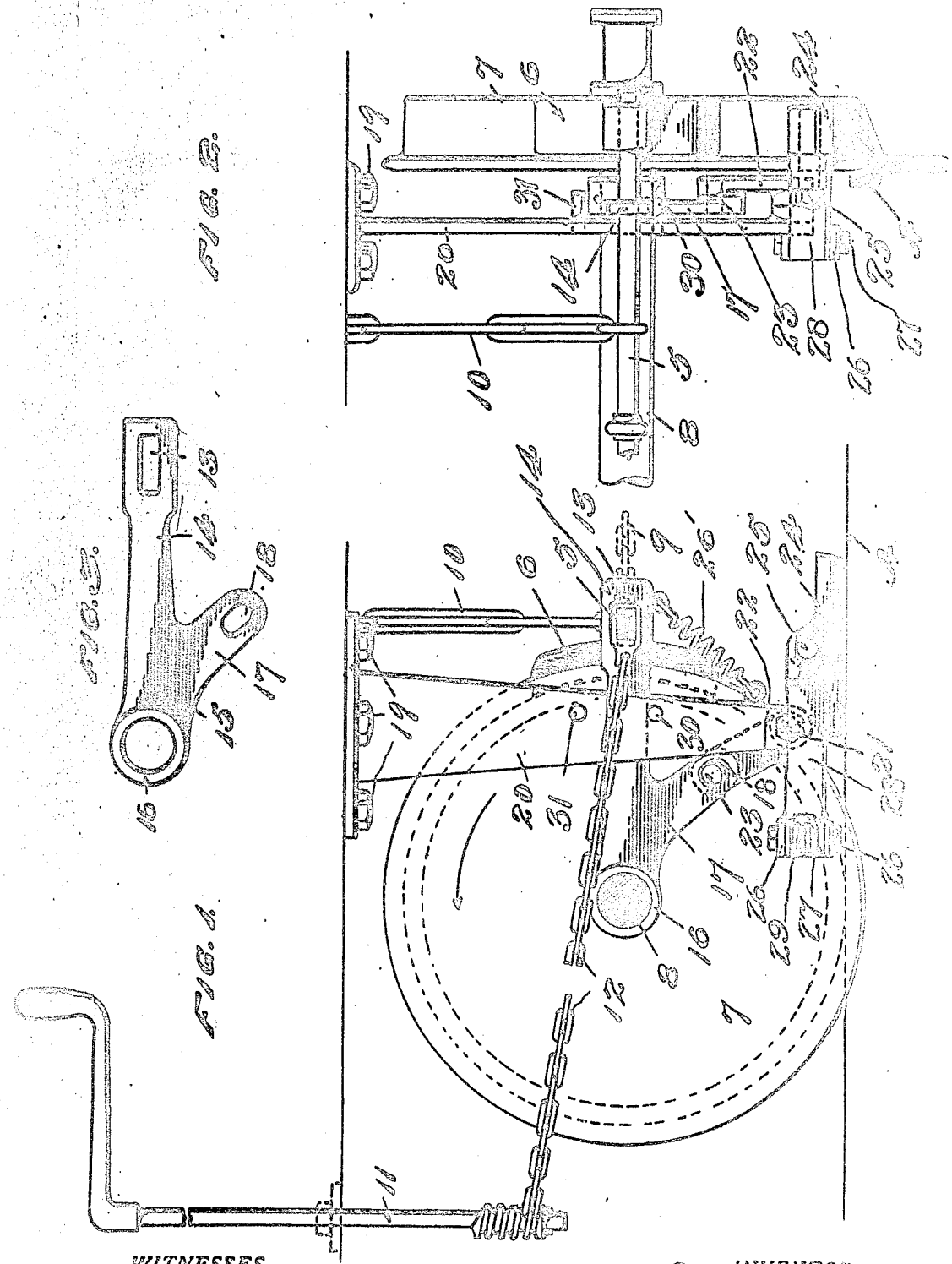

JACOB FINE, OF LOUISVILLE, KENTUCKY.

CAR-BRAKE.

No. 887,617.

Specification of Letters Patent.

Patented May 12, 1908.

Application filed February 21, 1908. Serial No. 417,013.

*To all whom it may concern:*

Be it known that I, JACOB FINE, citizen of United States, residing at Louisville, in the county of Jefferson and State of Kentucky, have invented certain new and useful Improvements in Car-Brakes, of which the following is a specification.

My invention relates to car brakes embodying braking members for engagement with the car wheel, and with the track rail adjacent the wheel, and the object thereof is to provide a more efficient device of this character, in which the engagement of the braking parts will be more positive in their action.

My invention further and specifically resides in the following features of construction, arrangement and operation, to be hereinafter described with reference to the accompanying drawings forming a part of this specification, in which like numerals are used to designate like parts throughout the several figures, and in which, Figure 1 is a side elevation of my improved mechanism. Fig. 2 is a rear elevation thereof, and Fig. 3 is a side elevation of the rail brake operating arm detached.

In the practical embodiment of my invention, I provide a brake beam 5, standing transversely beneath the body of the car and provided with brake shoes 6, to engage the peripheral face of the alined pairs of wheels 7 mounted upon an axle 8. The member beam 5 of the forward and rear pairs of wheels 7, may be connected if desired by a chain 9, said brake beams being swung from the body of the car by chains 10 and being connected to the brake rod 11 by a chain 12, to be drawn towards the wheels 7 by the rotation thereof. The brake beam 5 is horizontally slidably mounted through a longitudinal slot 13 in the horizontal arm 14 of a rail brake operating member 15, having a tubular portion 16 alined with said horizontal arm 14, and loosely mounted about the wheel axle 8. The rail brake operating member 15, is provided with an angular downwardly extending arm 17, having a longitudinal slot 18 therein, adjacent the end thereof, said member 15 being mounted upon the wheel axle 8 upon the inner side and adjacent the wheels 7, as shown in Fig. 2.

Extending downwardly from the body of the car and bolted thereto by bolts 19, is a bracket 20, arranged upon the inside and adjacent the member 15. Pivotally mounted upon the outside, and having its pivot pin 21 extending through the lower end of the bracket 20, is a bolt-crank-lever 22, provided upon its upper end with a projecting pin 23, extending through the slot 18 in the angular arm 17 of the member 15. The bolt-crank-lever 22 is provided adjacent the end of its lower horizontal portion, with spaced ears 26, having a bolt 27 projecting vertically therethrough and forming a pivot for a horizontal arm 28 extending approximately parallel of the bolt crank lever 22, and provided upon its free end with a rail shoe 24 pivotally connected thereto at 25. By virtue of its pivotal connection, at the bolt 27, the rail shoe carrying arm 28 may swing laterally to allow the same to maintain engagement with the rail when the same is rounding a curve, such swinging movement being tensioned by a spring 29 surrounding the pivot bolt 27.

From the foregoing it will be seen that when the brake rod 11 is rotated to draw the brake beam 5 toward the wheel 7, the wheel shoes 6 carried thereby, will contact with said wheels with a brake connection, and by reason of which engagement, and in view of the rotation of the wheel 7 in the direction of the arrow in Fig. 1, the rail brake operating member 15 will be swung upwardly upon the wheel axle 8, swinging the bell-crank-lever 22 upon its pivot 21, and forcing the rail shoe 24 into close braking engagement with the rail A. When the brake rod 11 is released, the mechanism will be returned to its normal released position, as shown in Fig. 1, by means of a retractile coil spring 26', connected to and extending between the outer end of the horizontal arm 14 of the member 15, and the bracket 20 adjacent its lower end. The bracket 20 is provided with stop pins 30 and 31 extending outwardly toward the wheel 7, and respectively defining the limits of the downward and upward movement of the horizontal arm 14 of the member 15 by reason of the frictional contact of the wheel shoes 6.

From the foregoing description, it will be apparent that I provide a highly efficient device which will be as readily and easily operated as the ordinary brake and in which the contact of the parts will be positive and unfailing in its action.

Having fully described my invention, I claim:

1. In a car brake of the character described, the combination of a wheel brake and means for moving the same toward its wheel, of a rocking member loosely pivotally mounted about the wheel axle, and having an arm to which said wheel brake is slidably connected to move toward its wheel, whereby said member will be rocked by the frictional contact between said wheel shoe and the rotating wheel, a rail brake suitably mounted to be moved into engagement with the rail adjacent said wheel, and connections between said rail brake and said rocking member for moving said rail brake into engagement with the rail upon the rocking thereof, substantially as described.

2. In a car brake of the character described, the combination of a wheel brake and means for moving the same toward its wheel, of a rocking member loosely pivotally mounted about the wheel axle, and having an arm to which said wheel brake is slidably connected to move toward the wheel, whereby said member will be rocked by the frictional contact between said wheel shoe and the rotating wheel, a rail brake suitably mounted to be moved into engagement with the rail adjacent said wheel, and means for limiting the rocking movement of said member, substantially as described.

3. In a car brake of the character described, the combination of a wheel brake and means for moving the same toward its wheel, of a rocking member loosely pivotally mounted about the wheel axle, and having an arm to which said wheel brake is slidably connected to move toward its wheel, whereby said member will be rocked by the frictional contact between said wheel shoe and the rotating wheel, a rail brake suitably mounted to be moved into engagement with the rail adjacent said wheel, and means for returning said rocking arm to its normal position upon the release of said wheel brake, substantially as described.

4. In a car brake of the character described, the combination of a wheel shoe, and means for moving the same into engagement with the wheel, a rocking member to which said shoe is connected to move toward its wheel, and adapted to be rocked by the frictional engagement of said wheel brake with said wheel, a rail brake suitably mounted adjacent said wheel, and means within said connections to allow of the lateral swinging movement of said roller, substantially as described.

5. In a car brake of the character described, the combination of a wheel brake and means for moving the same toward its wheel, of a rocking member loosely pivotally mounted about the wheel axle, and having an arm to which said wheel brake is slidably connected to move toward its wheel, whereby said member will be rocked by the frictional contact between said wheel shoe and the rotating wheel, a rail brake suitably mounted to be moved into engagement with the rail adjacent said wheel and means within said connections to allow of the lateral swinging movement of said roller, substantially as described.

6. In a car brake of the character described, the combination of a wheel brake and means for moving the same toward its wheel, of a rocking member loosely pivotally mounted about the wheel axle, and having an arm to which said wheel brake is slidably connected to move toward its wheel, whereby said member will be rocked by the frictional contact between said wheel shoe and the rotating wheel, a rail brake suitably mounted to be moved into engagement with the rail adjacent said wheel, and connections between said rocking member and said rail brake for operating the latter upon the rocking movement of the former, said means allowing for the lateral swinging movement of said rail brake, substantially as described.

7. In a car brake of the character described, the combination of a wheel brake and means for moving the same toward its wheel, of a rocking member loosely pivotally mounted about the wheel axle, and having an arm to which said wheel brake is slidably connected to move toward its wheel, whereby said member will be rocked by the frictional contact between said wheel shoe and the rotating wheel, a rail brake suitably mounted to be moved into engagement with the rail adjacent said wheel, and connections between said locking member and said rail brake for operating the latter upon the rocking movement of the former, said means allowing for the lateral swinging movement of said rail brake, substantially as described.

In testimony whereof I affix my signature in presence of two witnesses.

JACOB FINE.

Witnesses:
R. M. AUGUSTUS,
S. T. BEST.